Figure 1:
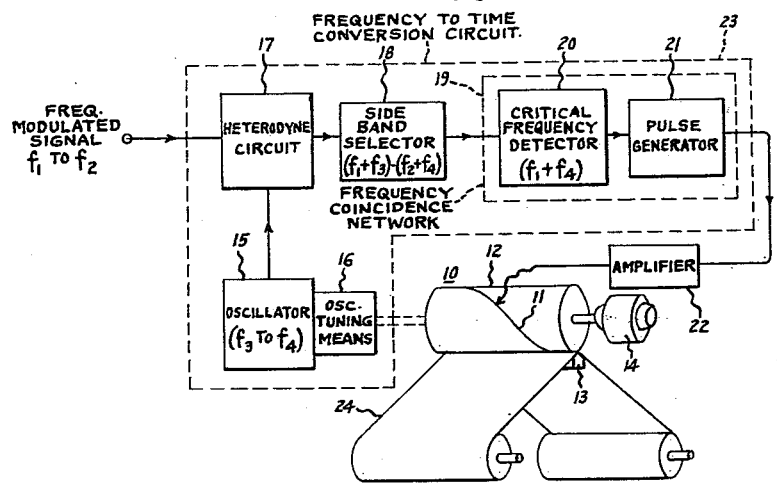

June 4, 1957     A. F. BISCHOFF     2,794,954
RECORDING DEVICE

Filed Feb. 13, 1952     2 Sheets—Sheet 1

Inventor:
Alfred F. Bischoff,
by Paul A. Frantz
His Attorney.

June 4, 1957 A. F. BISCHOFF 2,794,954
RECORDING DEVICE
Filed Feb. 13, 1952 2 Sheets-Sheet 2
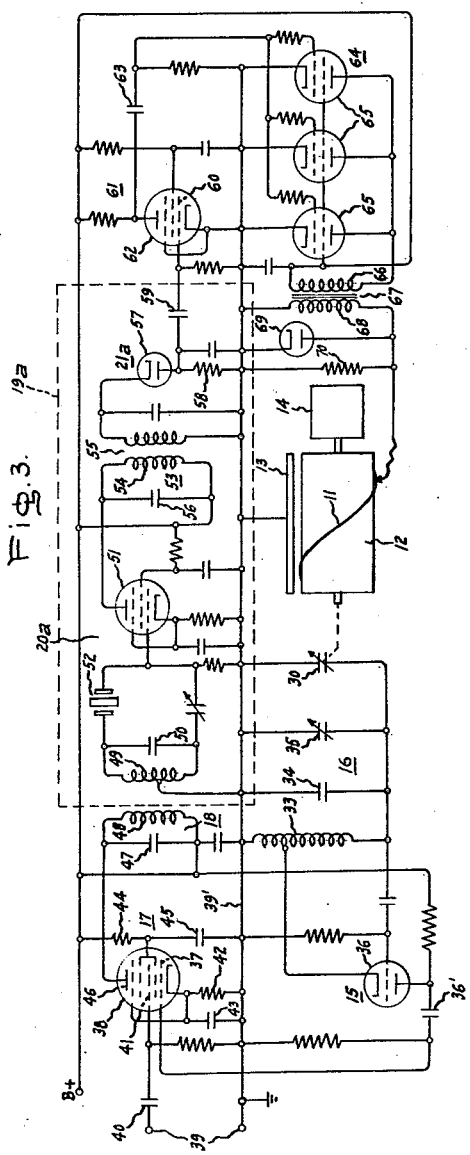
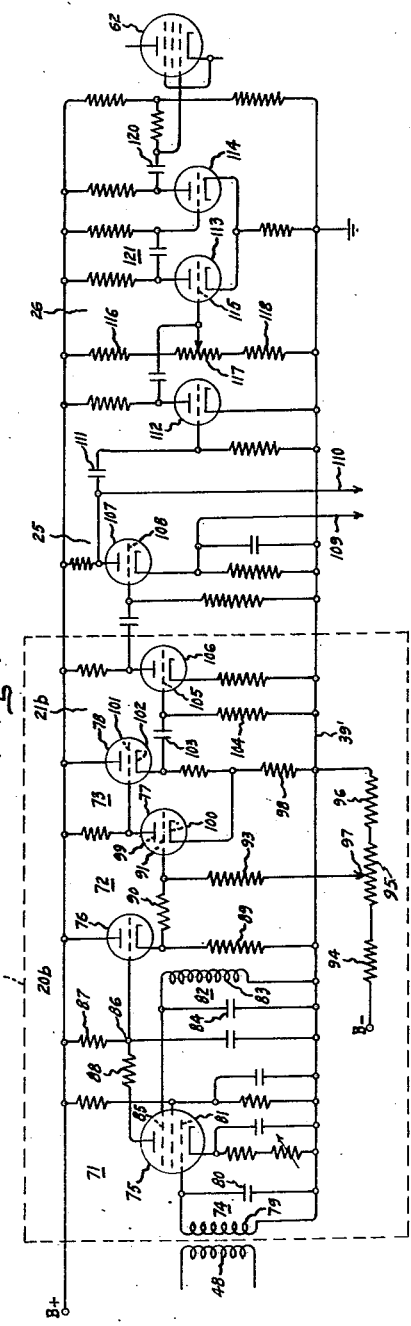
Inventor:
Alfred F. Bischoff,
by Paul A. Frank
His Attorney.

United States Patent Office 2,794,954
Patented June 4, 1957

2,794,954
RECORDING DEVICE

Alfred F. Bischoff, Ballston Spa, N. Y., assignor to General Electric Company, a corporation of New York Application February 13, 1952, Serial No. 271,403

5 Claims. (Cl. 324—79)

My invention relates to recording devices and more particularly to recording devices employing an electrical current pulse or "spark" as the recording medium.

Such current pulse recorders commonly employ facsimile techniques. A sheet of electrosensitive recording material is passed between two conductors, at least one of which is arranged to sweep periodically across this electrosensitive sheet, and a series of marks are printed upon the interposed sheet by the passage of current pulses or sparks between the two conductors. The position of each mark is, of course, dependent upon the position of the conductors relative to the electosensitive sheet at the moment that the current pulse is produced. Current pulse recorders of this general type are described and claimed in United States Patent 2,635,032, issued April 14, 1953, on copending application Serial No. 137,238, filed January 6, 1950, by Richard F. Shea, and United States Patent 2,596,118, issued May 13, 1952, on copending application Serial No. 111,538, filed August 20, 1949, by Alfred F. Bischoff and Kenneth L. Boring; both patents being assigned to the present assignee.

Recorders of this type have commonly been adapted only to record an amplitude modulated voltage signal. The amplitude-varying signal voltage is sampled during each periodic excursion of the moving conductor, and a voltage pulse is applied to effect a flow of current between the two conductors at an interval of time after the beginning of each excursion thereof which corresponds to the instantaneous amplitude of the sampled voltage.

The use of voltage amplitude signal modulation as the intelligence carrying medium, however, presents many difficulties in telemetering systems where it is desired to transmit and record information with great accuracy. Since the recorded mark represents an absolute amplitude of the input signal and not merely the percent of modulation or other relative amplitude change of the signal, it is necessary to maintain constant gain in all input amplifier stages of the recorder. In addition, it is rather difficult to amplify a slowly varying direct current signal without first converting the direct current signal into an alternating signal of higher frequency. Moreover, as is well known, variations in transmission characteristics of the atmosphere have a pronounced effect upon the amplitude and noise level of remotely transmitted amplitude modulated signals so as to impair greatly the accuracy of the recorded information received from remote transmitting stations, such as in radiosonde systems.

These difficulties may all be overcome by the use of signal frequency modulation as the carrier of intelligence. Current impulse type recording devices have not heretofore been well adapted, however, to the recordation of frequency modulated input signals.

A principal object of the invention, therefore, is to provide an improved, highly accurate recorder of the electrical current impulse type which is capable of recording the frequency deviations of an input signal.

Another object is to provide an electric current impulse type recorder capable of simultaneously recording a plurality of frequency modulated signals upon a single sheet of electrosensitive material.

A further object of the invention is to provide an improved frequency-to-time conversion circuit suitable for frequency-modulated signal-recording apparatus.

In fulfillment of this latter object, it is a further object of the invention to provide accurate and speedily responsive frequency coincidence networks which discriminate and produce voltage impulses only upon the occurrence of predetermined critical frequency signals.

In general, my improved recorder comprises a first conductor propelled in a manner to have a periodic positional displacement along a predetermined axis of an adjacent second conductor. A thin sheet of electrosensitive recording material is passed between the two conductors; and a frequency-to-time conversion circuit synchronized in operation to the movement of the first conductor produces, during each cyclical excursion of the first conductor, an electric impulse whose time of occurrence varies in accord with the frequency of an input alternating signal supplied to the conversion circuit. This electric impulse is amplified and utilized to produce a voltage pulse between the first and second conductors and a corresponding current pulse through the intermediate electrosensitive material.

The frequency-to-time conversion circuit preferably comprises an alternating voltage generator variable in frequency in accord with the relative positions of the two conductors, a heterodyne circuit arranged to mix this generated varying frequency voltage with a frequency modulated signal voltage, a side band frequency component selector for isolating, for example, the sum frequency components of the heterodyned voltages, and a frequency coincidence network for generating an electric impulse only upon the occurrence of a predetermined single or critical frequency component within the selected side band of frequencies. This critical frequency component thus occurs at a moment of time after the beginning of each cycle of relative movement between the two conductors, which moment depends upon the frequency of the input signal voltage.

Figure 2:
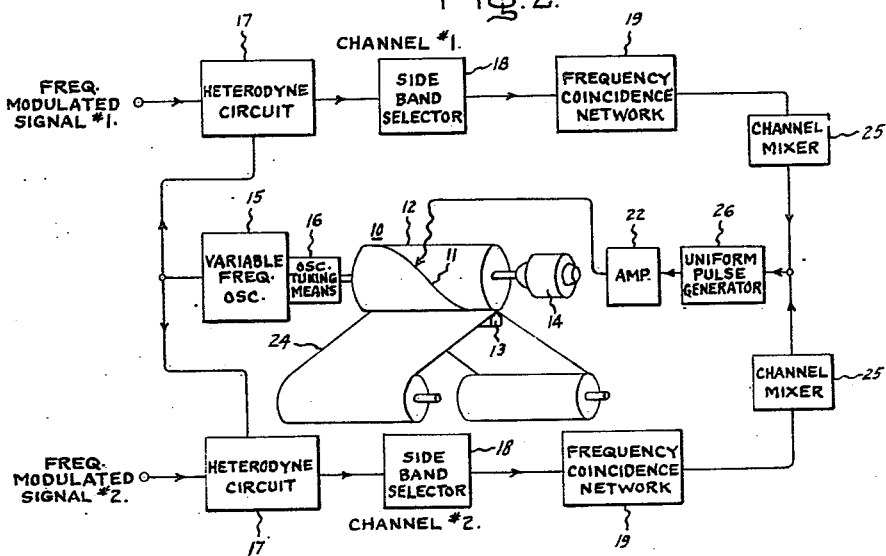
Figure 5:
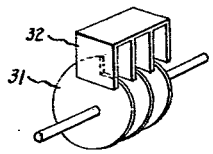

The novel features which I believe to be characteristic of the invention are set forth with particularity in the appended claims. The invention itself, however, together with further objects and advantages thereof, can best be understood by reference to the following description taken in connection with the accompanying drawing in which Fig. 1 is a block diagram of a single channel recorder embodying the invention; Fig. 2 is a similar block diagram of a multi-channel recorder embodying the invention; Fig. 3 is a schematic circuit diagram of the recorder shown in block diagram in Fig. 1; Fig. 4 is a schematic circuit diagram of a frequency coincidence network which may be substituted for the frequency coincidence network of the recorder shown in Fig. 3 in multi-channel operation in accordance with the block diagram of Fig. 2; and Fig. 5 is a typical variable capacitor structure suitable for use with the invention. In the drawings, similar components are designated by the same reference numerals.

Referring to Fig. 1, the invention is shown in block diagram form as comprising an electric current responsive printing means 10 in the form of a helical conductor 11 wound around the surface of an axially journalled drum 12 arranged to be rotated at a constant speed by any suitable means such as motor 14. A second straight conductor in the form of a printing bar 13 is located with an edge thereof adjacent and parallel to the surface of drum 12 such that helical conductor 11 upon rotation traverses the printing bar 13 with points of proximity continually varying along the length of bar 13. A sheet 24 of electrosensitive recording material or paper may be fed at a constant velocity through the gap between conductor 11 and printing bar 13, such that a pulse of current between conductors 11 and 13 produces a mark upon the interposed electrosensitive sheet 24. Suitable electrosensitive recording materials are now well known in the art and are widely available in the form of recording papers, such as "Alfax" paper impregnated with suitable electrolytes which change appearance upon the passage of an electric current therethrough. The introduction of metallic ions from the printing bar 13 into the electrolyte solution in the paper also intensifies the charring effect.

A generator of high frequency alternating voltage, designated as oscillator 15, is included in the recorder apparatus and is constructed to produce an output alternating voltage variable in frequency between two predetermined frequency values, designated abstractly as $f_3$ to $f_4$, in response to a corresponding variation in its tuning means 16. The oscillator tuning means 16, which may, for example, be a variable capacitor of the rotatable plate type, is mechanically connected to the varied periodically throughout its range with each revolution of drum 12. The frequency of the output voltage of oscillator 15 thus varies preferably in the form of a linear sawtooth frequency wave from $f_3$ to $f_4$ during each revolution of drum 12. The position of the oscillator tuning means is correlated to the relative positions of the helix 11 and printing bar 13 such that helix 11 just begins to traverse one end of printing bar 13 when the oscillator output frequency is equal to one frequency limit value ($f_3$), and is equal to the other limiting value ($f_4$) when the helix 13 has just finished traversing the other end of printing bar 13. If tuning means 16 constitutes a variable capacitor, the stator and rotor blades are so constructed and arranged that the capacitor has, for example, minimum capacity when helix 11 begins to traverse one end of printing bar 13 and maximum capacity when helix 11 is in a position traversing the other end of printing bar 13. A suitable capacitor construction is shown in Fig. 5. It will be noted that this capacitor construction also provides rapid flyback from maximum to minimum capacity of the tuning element in order to provide a sawtooth wave of frequency modulation of the oscillator output voltage.

The output voltage of oscillator 15 is supplied to a heterodyne circuit 17 where it is heterodyned with an input alternating voltage signal whose frequency modulation varies between frequency limits designated abstractly as $f_1$ to $f_2$ in accordance with the intelligence desired to be recorded. The rate of frequency variation of the input signal is preferably somewhat slower than the rate of frequency variation of oscillator 15 resulting from the rotation of the drum 12. Consequently, for any given revolution of drum 12, heterodyne circuit 17 effectively mixes a substantially single frequency input signal with the instantaneous frequency of the frequency varying output of oscillator 15 and the general frequency level of the frequency-varying output heterodyned voltages is thus determined by the frequency of the input signal. Drum 12 may be rotated, for example, at 60 revolutions per second to provide a corresponding 60 cycle rate or sweep of oscillator frequency variation, while the input signal is frequency modulated in accordance with the intelligence to be transmitted at a rate, for example, no greater than 5 cycles per second. The lower frequencies of the input signal may, for example, vary between frequency limits of 30 kilocycles ($f_1$) to 35 kilocycles ($f_2$), while the oscillator 15 output voltage frequencies may, for example, vary between 75 kilocycles ($f_3$) to 80 kilocycles ($f_4$).

The output of heterodyne circuit 17 is supplied to a frequency side band selector 18 which is tuned to accept only one side band of frequencies, such as the frequencies equal to the sum of the input signal frequency and the oscillator output voltage frequencies. Side band selector 18 thus has a frequency band pass characteristic varying from frequencies equal to the sum of $f_1$ and $f_3$ to frequencies equal to the sum of $f_2$ and $f_4$. With the carrier frequencies $f_1$, $f_2$, $f_3$, and $f_4$ mentioned above, this would mean that frequency side band selector 18 would have a frequency band pass of at least from 105 to 115 kilocycles.

The sum frequency components of the heterodyned input signal and oscillator output voltages are then supplied to a frequency coincidence network 19 which comprises a critical frequency detector 20 and a pulse generator 21. Critical frequency detector 20 is constructed to filter a predetermined single frequency or very narrow band of frequencies within the side band of frequencies passed by selector 18. This critical predetermined frequency is preferably equal to the sum of the lowest input signal frequency ($f_1$) and the highest oscillator output voltage frequency ($f_4$). Since the highest oscillator frequency ($f_4$) represents an end position of helix 11 relative to printing bar 13, it will be appreciated that a heterodyned voltage of this critical frequency ($f_1+f_4$) will be supplied to critical frequency detector 20 at a time which corresponds to some bar-traversing position of helix 11 as long as the frequency of the input signal is above this lower frequency limit ($f_1$). For example, with input signal frequency $f_1$ equal to 30 kilocycles and the highest oscillator voltage output frequency $f_4$ equal to 80 kilocycles, critical frequency detector would be constructed to select a frequency of 110 kilocycles. When the input signal actually had a frequency equal to 30 kilocycles, a 110 kilocycle voltage would be delivered to critical frequency detector 20 from heterodyne circuit 17 only when the frequency of the oscillator output voltage actually achieved 80 kilocycles, which would be the case when helix 11 reached one end of printing bar 13. With an input signal of higher frequency, such as 35 kilocycles ($f_2$), a 110 kilocycle frequency voltage would be delivered to critical frequency detector 20 from heterodyne circuit 17 only when the frequency of the oscillator output voltage was 75 kilocycles ($f_3$) which would, of course, be the case when helix 11 traversed the opposite end of printing bar 13. Input signals of intermediate frequencies between $f_1$ and $f_2$ will, of course, result in the occurrence of a heterodyned voltage of this predetermined critical frequency at corresponding intermediate positions of helix 11 relative to printing bar 13.

The critical frequency output voltage of detector 20 is employed to energize a pulse generator 21, and the output voltage pulse of generator 21 is amplified by any suitable pulse amplifier 22 and supplied between conductors 11 and 13 in order to produce the desired mark upon electrosensitive paper 24.

Although oscillator 15 is described above as providing an output voltage varying in frequency in accord with a sawtooth wave and over a frequency band width equal to the band width of the possible frequency modulation of the input signal to be recorded, it is to be understood that these particular frequency conditions are not essential to the operation of the invention although they enable maximum utilization of the recording facilities of printing means 10. As explained hereinbefore, the input signal to be recorded functions, by means of heterodyne circuit 17, to vary the general frequency level or range of the frequency-varying output voltage of oscillator 15. Consequently, oscillator 15 need only generate different frequency voltages for different predetermined positions of helix 11, and frequency coincidence network 19 need only be responsive approximately to the mid-frequency component of the output voltage of the side band selector 18 regardless of the individual frequency band widths of the two voltages that are heterodyned together.

Oscillator 15, heterodyne circuit 17, side band selector 18 and frequency coincidence network 19 constitute a frequency-to-time conversion circuit 23 since they function to produce an output voltage signal whose time of occurrence relative to a reference instant of time is dependent upon the frequency of an input signal. In the instant application, the operative time interval of the frequency-to-time conversion circuit is synchronized to the period of one revolution of the helical conductor 11. The position of helix 11 at the time of arrival of the output impulse from the frequency-to-time conversion circuit 23 thus represents the frequency of the input signal supplied to this frequency-to-time conversion circuit.

Referring to Fig. 2, I have shown a block diagram of the invention as embodied in a multi-channel recorder which enables more than one frequency modulated signal to be detected and simultaneously recorded. In this embodiment of the invention, printing means 10, variable frequency oscillator 15, amplifier 22 and a constant area pulse generator 26 are components which are common to all of the frequency detection channels. Each channel comprises a heterodyne circuit 17 receiving a common heterodyning signal from variable frequency oscillator 15, a side band selector 18, a frequency coincidence network 19 and a channel mixer 25. The output of each channel is a voltage impulse whose time of occurrence with respect to the position of helix 11 depends upon the frequency of the input signal involved. The various channel mixers 25 maintain the time segregation of the input pulses supplied thereto and deliver these input pulses individually to energize pulse generator 26. Pulse generator 26 thus produces as many pulses during one revolution of helix 11 as there are frequency detection channels in the equipment, and separate curves of the frequency modulation of the input signals supplied to each channel are thereby simultaneously delineated upon an electrosensitive material 24 interposed between conductors 11 and 13.

Details of the single channel recorder of Fig. 1 are shown in the schematic circuit diagram of Fig. 3. Rotatable helix-supporting drum 12 is driven in synchronism with the rotor of a variable capacitor 30 by motor 14. Variable capacitor 30 is constructed to have a constantly increasing capacitance over the greater portion of the rotational cycle of its rotor and to have a sharply decreasing capacitance back to an initial low capacitance condition during only a few angular degrees of its rotational displacement.

One suitable construction of capacitor 30 is shown in Fig. 5 wherein each rotor 31 comprises a disk with a spiral shaped periphery, and each stator 32 is arranged adjacent a peripheral portion of rotor 31. The position of rotor 31 is correlated to the position of helix 11 and the direction of rotation is such that the capacitance of capacitor 30 varies from minimum to maximum value or vice versa during the same period that helix 11 traverses the length of printing bar 13.

Capacitor 30 comprises a portion of a resonant circuit tuning means 16 of a conventional Hartley oscillator 15. The oscillator resonant circuit 16 comprises tapped inductance 33, fixed capacitor 34, adjustable trimmer capacitor 35 and variable capacitor 30, all connected in parallel. The output oscillatory voltage of oscillator 15 is taken from the anode of an electron discharge device 36 included in oscillator 15 and delivered through a coupling capacitor 36' to one control electrode 37 of a signal-mixing electron discharge device 38 in heterodyne circuit 17. The frequency of the oscillatory voltage delivered to control electrode 37 from oscillator 15 is, of course, dependent upon the position of rotor 31 of variable capacitor 30.

The input signal whose frequency modulation is to be detected and recorded is supplied to input terminals 39, one of which is preferably grounded and the other of which is connected through a coupling coupling capacitor 40 to a second control electrode 41 of discharge device 38. Suitable operating potentials for discharge device 38 are supplied by virtue of a biasing network comprising cathode resistor 42 and by-pass capacitor 43, and a constant screen voltage supplying network comprising resistor 44 and capacitor 45 connected between a high voltage source, B+, and the grounded conductor 39'. As is well known in the art, the mixed sum and difference frequency components of the input signal voltage delivered to electrode 41 and the oscillator voltage delivered to electrode 37 appear at anode 46 of discharge device 38. The proper side band of frequencies, i. e., either the sum frequency components or the difference frequency components of the heterodyned voltages are then selected by frequency side band selector 18 which may conveniently constitute a simple resonant circuit comprising capacitor 47 and transformer primary winding 48 broadly tuned, as desired, to either the sum or difference frequency components. Presuming that oscillator 15 is variable in frequency between 75 to 80 kilocycles as the result of the movement of variable capacitor 30, and the input signal carrier frequency supplied to control electrode 41 varies between 30 and 35 kilocycles; then resonant circuit 18 would be broadly tuned to select the band of summation frequencies between 105 to 115 kilocycles from the remaining frequency components of the heterodyned voltages. Alternatively, resonant circuit 18 may be broadly tuned to the difference frequencies, namely between 40 to 50 kilocycles.

The selected side band frequency voltages developed across resonant circuit 18 are inductively coupled to a frequency coincidence network 19a comprising frequency detector 20a associated with pentode electron discharge device 51 and a pulse generator 21a associated with diode device 57. Frequency detector 20a may be a very sharply tuned voltage amplification stage, as shown. Transformer secondary winding 49 and capacitor 50 constitute an input resonant circuit for the stage and are tuned to a predetermined single frequency as explained above in connection with the block diagram of Fig. 1. With the band of possible summation frequencies ranging between 105 and 115 kilocycles set forth above, this input resonant circuit of the critical frequency detector 20a is preferably tuned to 110 kilocycles. In order further to increase the frequency selectivity of this stage, a piezoelectric crystal 52 mechanically resonant to this 110 kilocycle critical frequency is preferably also connected in the input circuit of discharge device 51, as shown. An output resonant circuit 53 comprising primary winding 54 of output transformer 55 and capacitor 56 connected in parallel therewith is preferably also tuned to this same critical frequency. Due to the consequent very sharp frequency selectivity of this critical frequency detector 20a, an output voltage of substantial magnitude appears across output resonant circuit 53 only when the frequency of the signal supplied to the input circuit of this stage is equal to this predetermined critical frequency.

The critical frequency voltage output of detector 20a is rectified and formed into a voltage impulse in pulse generator stage 21a associated with diode rectifier 57. The rectified voltage impulse is developed across a load resistor 58 and delivered through capacitor 59 to the control electrode 60 of a voltage amplifying and inverting stage 61 associated with pentode discharge device 62. The amplified voltage output of voltage amplifier stage 61 is then supplied through coupling capacitor 63 to a power amplifier stage 64 comprising three parallel connected tetrode discharge devices 65 which serve to drive the primary winding 66 of an output pulse transformer 67. The output voltage pulse induced in the secondary 68 of transformer 67 is supplied between conductors 11 and 13. A rectifier 69 and a resistor 70 are preferably connected in parallel with secondary winding 68 and function as a direct current restorer network enabling conduction in only one direction between conductors 11 and 13. Inverter amplifier stage 61 and power amplifier stage 64 correspond to the amplifier designated as block 22 in Fig. 1.

As mentioned above, the use of an input signal frequency modulated at a slower rate than the frequency of rotation of helix 11 results in the delineation of a single curve representing the frequency modulation of the input signal upon the electrosensitive paper 24. It will be appreciated, however, that it is also possible to produce a number of simultaneous curves or to transmit and portray a complete pictorial representation by merely modulating the frequency of the input signal voltage supplied to terminals 39 at a high rate than the rotational frequency of helix 11. In this latter case, a heterodyned voltage of the critical frequency is supplied to the critical frequency detector 20 more than once during each revolution of helix 11, and output current pulses are produced between conductors 11 and 13 at different relative positions thereof corresponding to the different times of critical frequency occurrence during each cycle.

Referring now to Fig. 4, there is shown a schematic circuit diagram of an alternative frequency coincidence network 19b, a channel mixer 25, and a uniform pulse generator 26 which may advantageously be substituted for the frequency coincidence network 19a shown within a dashed line in Fig. 3 when it is desired, for example, to utilize the invention in a multi-channel recorder such as described in connection with the block diagram of Fig. 2. In the frequency coincidence network 19b of Fig. 4, a critical frequency detector 20b comprises a frequency discriminator circuit 71 associated with pentode discharge device 75, together with a cathode follower stage 72 associated with discharge device 76, and a voltage amplitude coincidence stage 73 associated with triode discharge devices 77 and 78. The frequency discriminator circuit may be of any suitable type which provides an output voltage varying in amplitude in accord with the frequency of an input signal voltage.

In the particular discriminator circuit illustrated in Fig. 4, an input resonant circuit 74 comprising inductance 79 and capacitor 80 connected to one control electrode 81, as well as a discharge-current-controlling resonant circuit 82 comprising inductance 83 and capacitor 84 connected to another control electrode 85 are both tuned to the predetermined critical frequency for example, 110 kilocycles. As is well known in the art, the effective voltages supplied to the respective control electrodes 81 and 85 of discharge device 75 from the two resonant circuits 74 and 82 are in phase quadrature to each other such that a change in frequency of the signal voltage supplied to the input control electrode 81 in one direction produces a reduction in the conduction of discharge device 75 while a change in frequency of the signal voltage on control electrode 81 in an opposite direction produces an increase in the conduction of discharge device 75. As a result, the amplitude of the voltage at the midconnection 86 of anode-connected load resistors 87 and 88 varies in linear fashion with frequency over the swept frequency range. The direction of frequency variation of the oscillator generated voltage resulting from the direction of rotation of capacitor rotor 31 is preferably such as to cause an increase rather than a decrease in voltage at connection 86 while helix 11 is traversing printing bar 13. This voltage developed at connection point 86 in the anode circuit of discharge device 75 is directly supplied to the control electrode of cathode follower discharge device 76.

The output voltage of this cathode follower stage 72 is developed across cathode resistor 89 and supplied through resistor 90 to a control electrode 91 of triode discharge device 77 included in the voltage amplitude coincidence stage 73. The actual magnitude of voltage on control electrode 91, however, is determined by means of a connection from electrode 91 through resistor 93 to an adjustable tap 97 of a potentiometer 95 included in a voltage dividing network comprising resistor 94, potentiometer 95 and resistor 96 connected between a source of negative voltage B— and the grounded conductor 39'. The adjustable tap 97 of potentiometer 95 is adjusted so that discharge device 77 is just rendered conductive, i. e., just exceeds the threshold of electron discharge conduction, when the amplitude of the voltage developed across cathode follower load resistor 89 reaches a voltage amplitude level representing the single predetermined critical frequency component within the heterodyned side band of frequencies supplied to frequency discriminator stage 71. It will be appreciated in adjusting this bias condition on discharge device 77 that a positive voltage also exists upon cathode 100 of discharge device 77 as the result of a common cathode resistor 98 which couples cathode 100 into the anode-to-cathode circuit of electron discharge device 78. Discharge devices 77 and 78 are connected in a conventional bistable multivibrator circuit which transfers between two steady state output voltage conditions whenever discharge device 77 is rendered conductive as a result of an input voltage of sufficient amplitude supplied between its cathode 100 and control electrode 91. In one steady state condition wherein discharge device 77 is non-conducting, discharge device 78 is maintained heavily conducting as a result of a high positive voltage supplied to its control electrode from the anode 99 of discharge device 77. When discharge device 77 begins to conduct as a result of a sufficiently positive voltage supplied to its control electrode, the voltage at anode 99 and control electrode 101 of discharge device 78 is correspondingly reduced to decrease the conduction of discharge device 78 and lower the voltage developed across cathode resistor 98 and supplied to the cathode 100 of discharge device 77. This decrease in voltage on cathode 100 augments the conduction of discharge device 77 and produces a regenerative action which quickly drives discharge device 77 to its maximum conduction condition and lowers the voltage on control electrode 101 of discharge device 78 to produce a minimum conduction condition of device 78. Voltage amplitude coincidence stage 73 comprising discharge devices 77 and 78 will, of course, remain in this latter stable condition until the voltage at the cathode of cathode follower discharge device 76 drops once again to a voltage level at which conduction of discharge device 77 is extinguished. This will occur at least at the end of each sweep of frequency variation of the output voltage of oscillator 15 as a result of the corresponding drop in the amplitude of the output voltage of frequency discriminator circuit 71.

The consequent extremely rapid change in voltage at cathode 102 of discharge device 78 is differentiated by means of a short time-constant network comprising capacitor 103 and grid return resistor 104. This differentiating network constitutes a pulse generator 21b and functions in well known manner to supply a negative-going impulse or "spike" of voltage to the control electrode 105 of a triode discharge device 106 connected in a voltage amplifying and inverting stage. This negative-going voltage impulse has a time of occurrence which, of course, depends upon the time that frequency discriminator 71 receives an input signal whose frequency is equal to the predetermined critical frequency, in the same manner as hereinbefore discussed in connection with the frequency coincidence network 19a of Fig. 3.

The anode voltage output of the inverter amplifier stage associated with discharge device 106 is supplied to a control electrode 108 of a triode discharge device 107 in the channel mixer amplifier stage 25 whose output is mixed with the output of the various other frequency detection channels of the apparatus. The respective cathodes and anodes of the discharge devices 107 in each channel mixer stage may be interconnected through suitable conductors 109 and 110, as indicated.

The combined positive-going impulses produced at the anodes of the various channel mixer stages 25 are supplied through a common coupling capacitor 111 to a voltage inverter stage associated with discharge device 112. The output of this latter voltage inverter stage is supplied to trigger a uniform pulse generator 26 shown as comprising a monostable triggered multivibrator circuit 121 including triode discharge devices 113 and 114. The multivibrator 121 is biased by connection from the control electrode 115 of discharge device 113 to a voltage dividing network comprising resistor 116, potentiometer 117 and resistor 118 and functions in a well known manner to produce an output voltage pulse of uniform amplitude and duration whenever an input trigger signal of sufficient magnitude is supplied to control electrode 115 from the anode of discharge device 112. The uniform output voltage pulses produced at the anode of discharge device 114 of the multivibrator circuit 121 are delivered through capacitor 120 to control electrode 60 of pentode discharge device 62 illustrated in Fig. 3. This pulse is then further amplified by power amplifier 64 and supplied between conductors 11 and 13 in the same manner as discussed above in connection with Fig. 3.

If the rate of frequency modulation of the input signal supplied to each channel is slower than the rotational frequency of drum 12, the number of triggering pulses supplied to uniform pulse generator 26 during any one revolution of helix 11 will, of course, be equal to the number of frequency selection channels in the apparatus, and separate curves of the frequency modulation of each channel will thus be delineated simultaneously on the electrosensitive material 24.

It will be appreciated that although I have shown the frequency coincidence network of Fig. 4 in connection with the multi-channel recorder of Fig. 2, it is equally applicable in connection with the single channel recorder of Fig. 1, and that it has the advantage of a more positive frequency-to-time conversion than that produced by the frequency coincidence network of Fig. 3. The magnitude of electric impulse produced by the multivibrator circuit 73 associated with discharge devices 77 and 78 is of an appreciably greater magnitude than the electric impulse produced at the cathode of diode 57 in the circuit of Fig. 3. Moreover, the uniform pulse generator 26 may also be advantageously added to the addition of the recorder of Fig. 1 to insure the passage of uniform amplitude and duration current pulses between conductors 11 and 13 and thus to produce marks upon electrosensitive paper 24 having uniform appearance.

Although I have described above certain preferred embodiments of this invention, many modifications may be made. It is to be understood, therefore, that I intend by the appended claims to cover all such modifications as fall within the true spirit and scope of my invention.

What I claim as new and desire to secure by Letters Patent of the United States is:

1. Recording apparatus comprising a straight conductor and an adjacent rotatable helical conductor arranged upon rotation to traverse a length of said straight conductor, means for generating an alternating voltage varying in frequency in accord with variations in the rotational position of said helical conductor, means for heterodyning said frequency-varying generated voltage with an alternating signal voltage, a frequency discriminator connected to receive said heterodyned voltages for providing an output voltage varying in amplitude in accord with the frequency variations of said heterodyned voltages and independent of the amplitude thereof, and means including a pulse generator for delivering a current pulse of preselected amplitude and duration between said two conductors, said pulse generator being connected to receive said amplitude varying output voltage of said discriminator and being operative only in response to a predetermined amplitude level thereof.

2. Recording apparatus comprising a printing bar and an adjacent rotatable helix arranged upon rotation to traverse a length of said bar, an oscillator having tuning means mechanically interconnected with said conductor for generating an alternating voltage varying in frequency in accord with the position of said helical conductor relative to said printing bar, a heterodyning circuit connected to receive said oscillator generated voltage for heterodyning said generated voltage with an input signal voltage whose frequency modulation is to be recorded, a frequency side band selector connected to receive the heterodyned voltages for selecting a predetermined frequency side band thereof, a frequency discriminator connected to receive said selected side band of heterodyned voltages and providing an output voltage varying in amplitude in accord therewith and substantially independent of the amplitude thereof, and means including a pulse generator operative only in response to a predetermined amplitude level of voltage received from said discriminator for delivering a voltage pulse between the conductor and the printing bar upon the occurrence of a discriminator output voltage having said amplitude level.

3. A frequency-to-time conversion circuit comprising an oscillator having variable tuning means for generating an alternating voltage of variable frequency, means for cyclically varying said tuning means to vary cyclically the frequency of said oscillator generated voltage, a heterodyne circuit connected for heterodyning said oscillator generated voltage with an input alternating signal voltage whose frequency is to be time-converted, means selecting the summation frequency components of the heterodyned voltages, a frequency discriminator circuit connected to receive said summation frequency components for providing an output voltage varying in amplitude in accord with the frequency variation of its received voltages and substantially independent of the amplitude thereof, and voltage pulse generating means connected to receive the output voltage of said discriminator circuit and responsive only to a predtermined amplitude level thereof.

4. A frequency coincidence network comprising a frequency discriminator circuit for providing an output voltage varying in amplitude in accord with the frequency of an input alternating signal supplied thereto and substantially independent of the amplitude thereof, a multivibrator connected to receive said discriminator circuit output voltage, said multivibrator being rapidly transferable between two different output voltage level conditions of operation in response to an input voltage of a single predetermined polarity and a preselected amplitude level, and means utilizing a transfer in output voltage level of said multivibrator to produce a voltage pulse representing the occurrence of a predetermined input signal frequency.

5. Apparatus for the simultaneous recording of the frequency modulation of a plurality of input alternating signal voltages comprising a rotatable helical conductor, and an oscillator having tuning means mechanically interconnected with said conductor for generating an alternating voltage varying in frequency in accord with the rotational position of said conductor, a pulse generator connected to deliver a voltage pulse to said conductor, and a plurality of frequency detection channels connected between said oscillator and said pulse generator and each comprising a heterodyne circuit for heterodyning said oscillator generated voltage with an input signal voltage, a frequency side band selector connected to receive the heterodyne voltages for selecting a predetermined frequency side band thereof, a frequency discriminator connected to receive said selected side band of heterodyned voltages and providing an output voltage varying in amplitude in accord therewith and substantially independent of the amplitude thereof, and means including a pulse generator operative only in response to a predetermined amplitude level of voltage received from said discriminator for delivering a voltage pulse between the conductor and the printing bar upon the occurrence of a discriminator output voltage having said amplitude level.

References Cited in the file of this patent
UNITED STATES PATENTS

| | | |
|---|---|---|
| 1,994,232 | Schuck | Mar. 12, 1935 |
| 2,215,197 | Sherman | Sept. 17, 1940 |
| 2,295,615 | Tucker | Sept. 15, 1942 |

(Other references on following page)

UNITED STATES PATENTS

| | | |
|---|---|---|
| 2,413,182 | Hollingsworth et al. | Dec. 24, 1946 |
| 2,425,003 | Potter | Aug. 5, 1947 |
| 2,477,634 | Lowe | Aug. 2, 1949 |
| 2,508,547 | Slonczewski | May 23, 1950 |
| 2,525,328 | Wolff | Oct. 10, 1950 |
| 2,540,081 | Alden | Feb. 6, 1951 |
| 2,555,175 | Whitford | May 29, 1951 |
| 2,560,247 | Rich | July 10, 1951 |
| 2,565,008 | Wallace | Aug. 21, 1951 |
| 2,608,652 | Heller | Aug. 26, 1952 |
| 2,629,829 | Daly | Feb. 24, 1953 |
| 2,632,036 | Hurvitz | Mar. 17, 1953 |